United States Patent
DeLuca et al.

(10) Patent No.: US 9,948,978 B2
(45) Date of Patent: Apr. 17, 2018

(54) DETERMINING ALTERNATIVES WHEN A RECORDING CONFLICT OCCURS

(71) Applicant: INTERNATIONAL BUSINESS MACHINES CORPORATION, Armonk, NY (US)

(72) Inventors: Lisa Seacat DeLuca, Baltimore, MD (US); Dana L. Price, Cary, NC (US); Shelbee D. Smith-Eigenbrode, Thornton, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 80 days.

(21) Appl. No.: 14/146,361

(22) Filed: Jan. 2, 2014

(65) Prior Publication Data

US 2015/0189370 A1 Jul. 2, 2015

(51) Int. Cl.
| | |
|---|---|
| G06F 3/00 | (2006.01) |
| G06F 13/00 | (2006.01) |
| H04N 5/445 | (2011.01) |
| H04N 21/433 | (2011.01) |
| H04N 21/458 | (2011.01) |
| H04N 21/475 | (2011.01) |

(52) U.S. Cl.
CPC ..... *H04N 21/4334* (2013.01); *H04N 21/4583* (2013.01); *H04N 21/4758* (2013.01)

(58) Field of Classification Search
CPC .................................................. H04N 21/4583
See application file for complete search history.

(56) References Cited

U.S. PATENT DOCUMENTS

| | | | |
|---|---|---|---|
| 8,195,035 B2 | 6/2012 | Bhogal et al. | |
| 8,272,015 B2 | 9/2012 | Schwesinger et al. | |
| 2004/0070594 A1* | 4/2004 | Burke | 345/716 |
| 2004/0177369 A1* | 9/2004 | Akins, III | 725/31 |
| 2005/0055716 A1* | 3/2005 | Louie | G06F 1/1632 725/58 |
| 2007/0071399 A1* | 3/2007 | Ellis | 386/83 |
| 2008/0134239 A1* | 6/2008 | Knowles | H04N 5/44543 725/39 |
| 2008/0163307 A1* | 7/2008 | Coburn et al. | 725/61 |
| 2008/0276284 A1 | 11/2008 | Bumgardner et al. | |
| 2009/0119715 A1* | 5/2009 | Schwesinger et al. | 725/58 |
| 2009/0220216 A1 | 9/2009 | Marsh et al. | |

(Continued)

OTHER PUBLICATIONS http://support.tivo.com/app/answers/detail/a_id/369, Tivo, 2013; 3 pages.

*Primary Examiner* — Joshua D Taylor
(74) *Attorney, Agent, or Firm* — Lisa Ulrich; Andrew M. Calderon; Roberts Mlotkowski Safran Cole & Calderon, P.C.

(57) ABSTRACT

A method includes receiving a recording request from a user. The method also includes determining a recording conflict based on the recording request, wherein the recording conflict includes a plurality of programs. The method additionally includes generating a plurality of options that resolve the recording conflict, wherein the plurality of options are based on determining available re-broadcasts of the plurality of programs. The method further includes presenting the plurality of options to the user.

7 Claims, 5 Drawing Sheets

(56) References Cited

U.S. PATENT DOCUMENTS

| | | | |
|---|---|---|---|
| 2010/0135639 A1* | 6/2010 | Ellis | G11B 27/105 |
| | | | 386/291 |
| 2010/0153986 A1 | 6/2010 | Ellis | |
| 2012/0315021 A1 | 12/2012 | Schwesinger et al. | |
| 2013/0133009 A1 | 5/2013 | Bhogal et al. | |
| 2013/0142498 A1 | 6/2013 | Correy et al. | |

* cited by examiner

| | | | |
|---|---|---|---|
| Drama2 | TUE 10/25 | 9:00PM-10:00PM | ← 411 |
| Drama2 | TUE 10/25 | 10:00PM-11:00PM | ← 412 |
| Drama2 | WED 10/26 | 9:00PM-10:00PM | ← 413 |
| Drama2 | WED 10/26 | 10:00PM-11:00PM | ← 414 |

| | | | |
|---|---|---|---|
| Movie1 | TUE 10/25 | 8:00PM-10:00PM | ← 415 |
| Movie1 | WED 10/26 | 8:00AM-10:00AM | ← 416 |
| Movie1 | WED 10/26 | 7:00PM-9:00PM | ← 417 |

| | | | |
|---|---|---|---|
| Sitcom4 | TUE 10/25 | 9:30PM-10:00PM | ← 420 |
| Sitcom4 | WED 10/26 | 12:30AM-1:00AM | ← 421 |
| Sitcom4 | THU 10/27 | 12:30AM-1:00AM | ← 422 |
| Sitcom4 | FRI 10/28 | 12:30AM-1:00AM | ← 423 |

DETERMINING ALTERNATIVES WHEN A RECORDING CONFLICT OCCURS

FIELD OF THE INVENTION

The present invention generally relates to recording systems and, more particularly, to conflict resolution in digital video recorders.

BACKGROUND

A digital video recorder (DVR), also called a personal video recorder (PVR), is a device that records media (e.g., video and/or audio) in a digital format to a disk drive or other storage medium. The media is typically provided by a video service provider and may include broadcast television programming, on-demand programming, audio programming, and the like. A DVR may be embodied as a stand-alone set-top box, integrated with a television, or as software for personal computers which enables video capture and playback to and from disk. A DVR provides several features such as time shifting (e.g., recording a broadcast program for later viewing), pausing live broadcasts, instant replay of interesting scenes, chasing playback, and skipping advertising.

A DVR typically includes at least one tuner that is operable to tune-in to a user selected channel in order to play or record media content being presented on that channel by the media service provider. Most currently available tuner systems are comprised of two tuners although it is possible to have more than two. With two tuners, a control unit user is able to play one channel while recording another or record two channels at the same time for example.

A user typically interacts with a DVR via an infrared remote control that communicates with the DVR and a program guide that is displayed on the user's display device (e.g., television) by the DVR. The user utilizes the remote control to navigate within the program guide and select programs to be recorded. However, when scheduling a recording with the DVR, often times the maximum number of recordings for a given time is exceeded. For example, when a DVR is limited to recording a maximum of two channels at the same time, a conflict occurs when the user attempts to schedule three or more recordings at the same time. Conventional DVR systems resolve such conflicts by forcing the user to cancel one or more of the scheduled recordings in order to stay within the maximum number of recordings permitted at any given time.

SUMMARY

In a first aspect of the invention, there is a method that includes receiving, by a computer device, a recording request from a user. The method also includes determining, by the computer device, a recording conflict based on the recording request, wherein the recording conflict includes a plurality of programs. The method additionally includes generating, by the computer device, a plurality of options that resolve the recording conflict, wherein the plurality of options are based on determining available re-broadcasts of the plurality of programs. The method further includes presenting, by the computer device, the plurality of options to the user.

In another aspect of the invention, there is a computer program product for resolving recording conflicts. The computer program product includes a computer usable storage medium having program code embodied in the storage medium. The program code is readable/executable by a computing device to: receive a recording request from a user; determine a recording conflict based on the recording request, wherein the recording conflict includes a plurality of programs; generate a plurality of options that resolve the recording conflict; and present the plurality of options to the user. The determining, the generating, and the presenting are performed automatically after the receiving the request. The plurality of options includes a first set of respective options for delaying recording one or more of the plurality of programs and a second set of respective options for canceling recording one or more of the plurality of programs. The presenting comprises displaying an amount of delay associated with each said of the respective options for delaying recording one or more of the plurality of programs.

In a further aspect of the invention, there is a computer system for resolving recording conflicts. The system includes a CPU, a computer readable memory and a computer readable storage medium. Additionally, the system includes one or more program instructions. The program instructions are operable to automatically determine a recording conflict based on a recording request, wherein the recording conflict includes a plurality of programs. The program instructions are also operable to automatically generate a plurality of options that resolve the recording conflict, wherein the plurality of options are based on re-broadcasts of the plurality of programs. The program instructions are additionally operable to automatically present the plurality of options to a user as selectable options in an interface. The program instructions are further operable to receive a selection of one of the plurality of options by the user via the interface. The program instructions are also operable to store data defining a recording schedule that includes a recording of each of the plurality of programs based on the received selection. The program instructions are stored on the computer readable storage medium for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
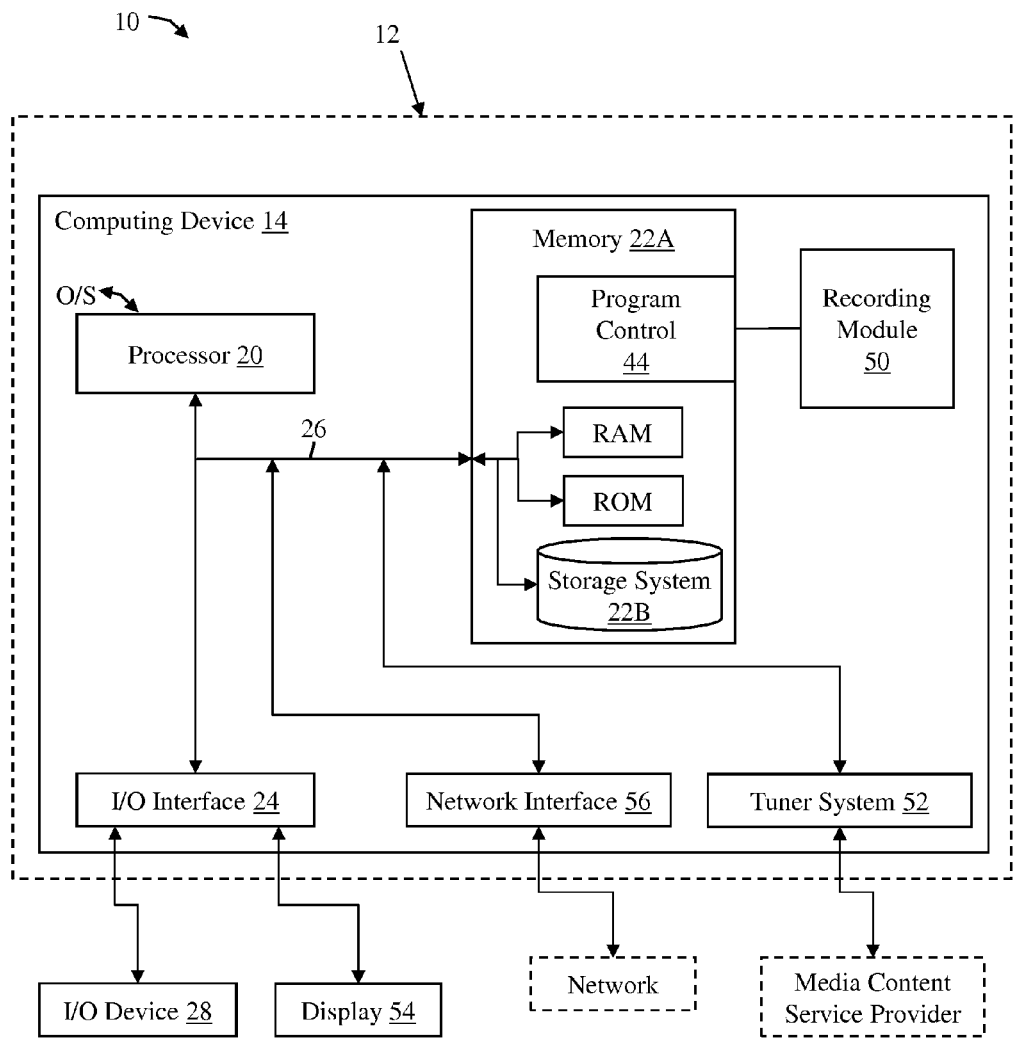
FIG. 1 shows an illustrative environment for implementing the steps in accordance with aspects of the invention.

The present invention generally relates to recording systems and, more particularly, to conflict resolution in digital video recorders. In accordance with aspects of the invention, there are systems and methods for resolving recording conflicts in digital media recorders, such as digital video recorders. In embodiments, a system determines when there is a recording conflict, automatically determines options for recording all of the programs included in the recording conflict, and automatically presents the options to a user in a selectable format. The options may include delaying the recording of one or more of the programs to a later time slot to resolve the conflict. The options may also include splitting a recording of one or more of the programs into separate partial recordings at different time slots to resolve the conflict. The options may be determined and presented to the user based on user preferences, including but not limited to: ranking according to shortest delay; ranking based on user-defined priorities; determining options based on user calendar; and determining options based on user-indicated tolerance for partial recordings. In this manner, implementations of the invention automatically determine and present plural options for resolving a recording conflict.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium and/or device (hereinafter referred to as computer readable storage medium). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, environment 10 includes a server 12 or other computing system that can perform the processes described herein. In particular, server 12 includes a computing device 14. The computing device 14 can be resident on a network infrastructure or computing device of a third party service provider (any of which is generally represented in FIG. 1).

The computing device 14 also includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with external I/O device/resource 28 and storage system 22B. For example, I/O device 28 can comprise any device that enables an individual to interact with computing device 14 (e.g., user interface) or any device that enables computing device 14 to communicate with one or more other computing devices using any type of communications link. The external I/O device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls recording module 50, e.g., that performs one or more of the processes described herein. Recording module 50 can be implemented as one or more program code in program control 44 stored in memory 22A as separate or combined modules. Additionally, recording module 50 may be implemented as separate dedicated processors or a single or several processors to provide the function of these tools. While executing the computer program code, processor 20 can read and/or write data to/from memory 22A, storage system 22B, and/or I/O interface 24. The program code executes the processes of the invention. The bus 26 provides a communications link between each of the components in computing device 14.

According to aspects of the invention, computing device 14 comprises a DVR that receives media content from a service provider at a tuner system 52 and outputs signals to display the media content to a display 54, such as a television. The media content may include at least one of video and audio, such as broadcast programming, on-demand programming, and the like. The tuner system 52 may include one or more individual independent tuners. The tuners are operable to tune-in to a user selected channel in order to play or record media content being presented on that channel by the service provider. In this embodiment, the I/O device 28 may comprise a remote control and the I/O interface 24 may comprise an infrared interface for receiving commands from the remote control, although other configurations may be used within the scope of the invention. The DVR (e.g., computing device 14) may include a network interface 56 that is connected to the bus 26 and arranged for connection to an external network such as the Internet.

In operation, the DVR (e.g., computing device 14) operates to record (e.g., store) user-selected media content in storage system 22B, which may comprise at least one of hard disk drive(s) and solid state (e.g., flash) memory. The user may select media content to record via a program guide that is presented at display 54, the program guide being based on information received from the service provider. Specifically, the user may navigate the program guide using the remote control (e.g., I/O device 28) and select a program to record on particular channel at a particular time, as is understood by those of ordinary skill in the art. Additionally or alternatively to selecting media content using a remote control, a user may select a media content to record using a user computer device that communicates with the DVR via the network interface 56. For example, a user computer device, such as a smartphone, laptop computer, tablet computer, desktop computer, etc., may run software that provides a user with an interface for selecting media content to record with the DVR. The user computer device may communicate such selections to the DVR over a network such as a local area network, the Internet, etc.

In accordance with aspects of the invention, the recording module 50 detects when there is a conflict with a user-selected recording and determines alternatives to resolve the conflict using the methods described herein. For example, the recording module 50 is configured to detect when a user attempts to record more than the maximum permissible number of programs at a particular time slot. Upon such detection, the recording module 50 is configured to automatically determine and present to the user options for recording all of the desired programs. In embodiments, the determining options includes automatically determining other playing times (e.g., re-broadcasts) of the selected programs, and generating alternative recording schedules based on the other playing times. In further embodiments, the generating of the alternative recording schedules may also be based on parameters such as: shortest delay for recording all programs; user-defined priorities; and a user calendar.

The computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
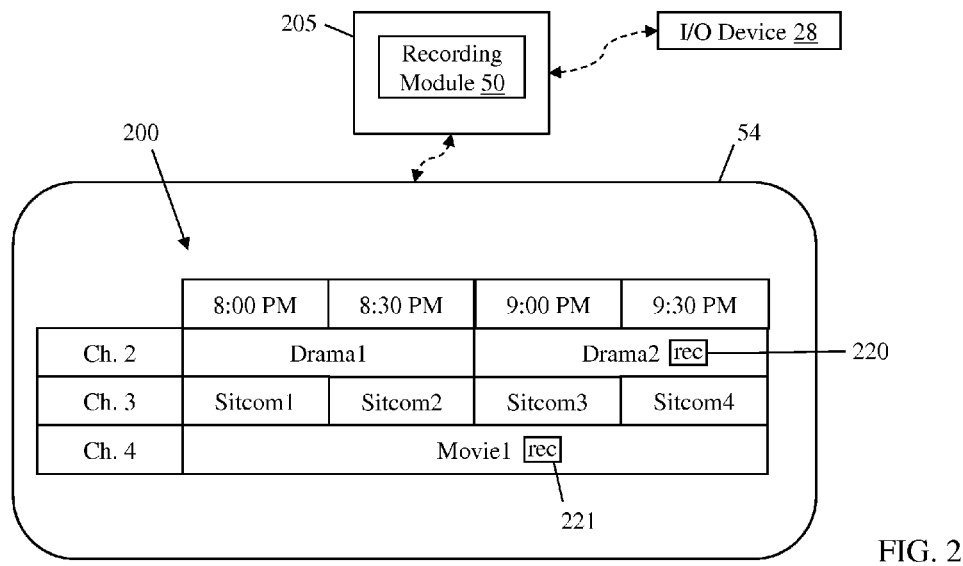
FIGS. 2 and 3 depict exemplary program guides utilized with systems and methods in accordance with aspects of the invention.
Figure 3:
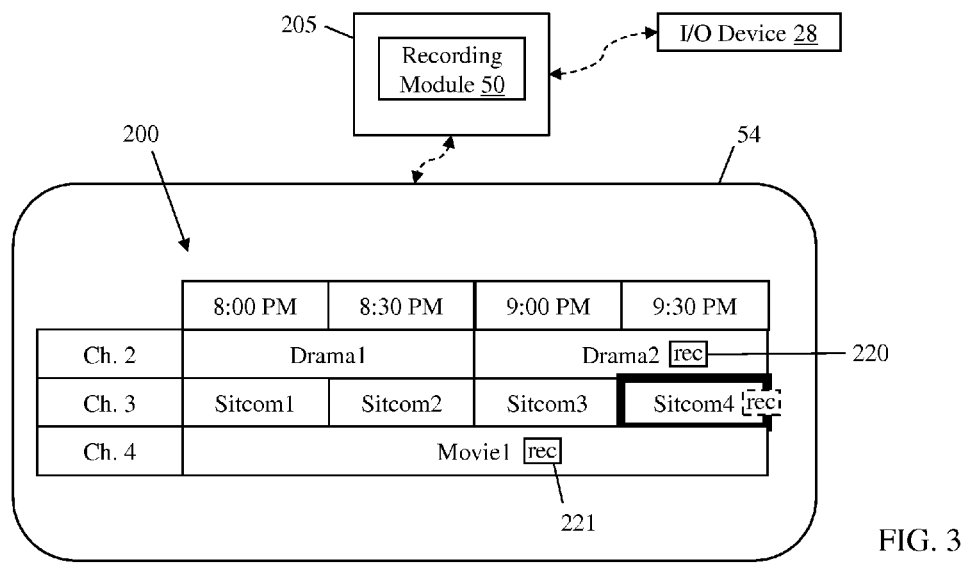

FIGS. 2 and 3 depict an exemplary program guide 200 utilized with systems and methods in accordance with aspects of the invention. The program guide 200 includes a grid of channels, time slots, and programs. The program guide 200 may be displayed on a display device 54 based on data communicated to the display device from a DVR 205, which may comprise computing device 14 of FIG. 1. A user may navigate within the program guide 200 using an input device, such as I/O device 28, which may be an infrared remote control that communicates with the DVR 205. The generating and displaying of the program guide 200, and the navigating within the program guide 200, may be performed using techniques understood by those of skill in the art such that further explanation is not necessary. The program guide 200 may have any desired visual appearance, and may include any desired number of channels. Moreover, DVR 205 is not limited to a set-top box, and may be any appropriately configured computing device situated at any suitable location, including integrated with the display 54, remote from the display 54, etc.

Still referring to FIG. 2, the "rec" indicator 220 indicates that program Drama2 is scheduled to be recorded from 9:00 PM to 10:00 PM on Channel 2. The "rec" indicator 221 indicates that program Movie1 is scheduled to be recorded from 8:00 PM to 10:00 PM on Channel 4. The scheduled recording of Drama2 and Movie1 may be initiated in any suitable fashion. For example, a user may navigate within the program guide 200 using a remote control, highlight a program (e.g., Drama2, Movie1, etc.) in the displayed program guide 200, and push a record button on the remote control to schedule a recording of the program. In another example, the scheduled recording of a program (e.g., Drama2, Movie1, etc.) may be part of a scheduled series of recordings initiated by the user. In an even further example, the user may initiate a scheduled recording of a program (e.g., Drama2, Movie1, etc.) using a separate computing device, such as a smartphone, tablet computer, laptop computer, or desktop computer, that communicates with the DVR 205 via a communication network, e.g., via network interface 56 of FIG. 1. In all such cases, the DVR 205 may store data defining scheduled recordings (e.g., date, time, channel, etc.) in memory, e.g., memory 22A of FIG. 1.

FIG. 3 shows the program guide 200 in which the user is attempting to schedule a third recording at a time slot where two other recordings are already scheduled. In this example, Drama2 and Movie1 are already scheduled to be recorded during the 9:30 PM-10:00 PM time slot, and the user has initiated a request to record Sitcom4 during the same 9:30 PM-10:00 PM time slot. For purposes of this example, the DVR 205 is described as being capable of recording a maximum of two programs simultaneously at any given time, e.g., due to having two tuners. However, the invention is not limited to a DVR with two tuners, and may be used with a DVR with any number of tuners. A recording conflict occurs when the DVR 205 has "n" tuners and a user initiates n+1 recordings at a single time slot, e.g., more recordings than there are tuners. In this example, the user has created a recording conflict by attempting to record three programs in the same time slot, e.g., 9:30 PM-10:00 PM.

According to aspects of the invention, when a recording conflict occurs, the system automatically determines and displays a number of user-selectable options for recording all of the requested programs. In embodiments, the recording module 50 searches programming data for future repeat broadcasts (also called re-broadcasts) of each of the programs involved in the recording conflict. Based on determined future broadcast dates and times for each program, the recording module 50 generates solutions for recording all of the programs by avoiding recording conflicts. In aspects, the system displays the generated solutions as user-selectable options in or over the program guide.

Figures 4, 5:
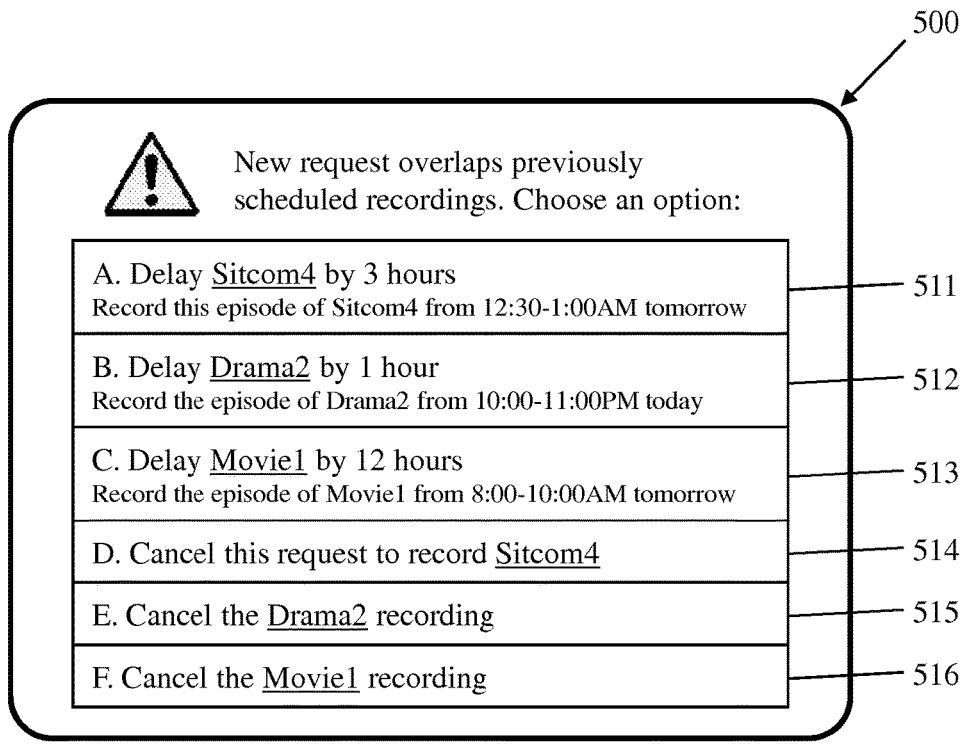
FIG. 4 depicts determining available re-broadcasts in accordance with aspects of the invention.
FIGS. 5-7 show an exemplary user interface in accordance with aspects of the invention.

FIG. 4 illustrates aspects of the system searching for future broadcasts of the programs involved in the recording conflict in accordance with aspects of the invention. In the example of FIG. 3, the programs Drama2, Movie1, and Sitcom4 are involved in a recording conflict. Accordingly, in aspects of the invention as depicted in FIG. 4, the system determines future broadcast dates and times for each of the conflicting programs, i.e., Drama2, Movie1, and Sitcom4. For example, FIG. 4 shows the initially requested date and time for recording Drama2 at row 410, and also shows future dates and times of re-broadcasts of Drama2 at rows 411, 412, and 413. Similarly, FIG. 4 shows the initially requested date and time for recording Movie1 at row 415, and also shows future dates and times of re-broadcasts of Movie1 at rows 416 and 417. Similarly, FIG. 4 shows the initially requested date and time for recording Sitcom4 at row 420, and also shows future dates and times of re-broadcasts of Sitcom4 at rows 421, 422, and 423.

In embodiments, the date, time, and channel of re-broadcasts are determined by searching the programming schedule data provided by or obtained from the media content service provider. The searching may be performed by the recording module 50 using one or more of the program name, episode number, unique identifier, original broadcast date, or the like. In embodiments, the searching is confined to a single media source (such as television signal), and avoids solutions that require additional sources (such as Internet data). The system or user may define a time period that limits the extent of the search for re-broadcasts. For example, the user may designate that the system should search for re-broadcasts up to one week from the time slot of the recording conflict.

FIG. 5 shows an exemplary interface 500 that is generated by the DVR 205 based on the data of FIG. 4, and displayed to the user on the display 54. In embodiments, the interface 500 includes different options for delaying recording each of the programs involved in the recording conflict. In this example, a first option 511 is to record Drama2 and Movie1 at their currently schedule times (e.g., as shown in FIG. 3), and to delay recording Sitcom4 to the soonest re-broadcast date and time of Sitcom4 for which there is not a recording conflict, which corresponds to row 421 of FIG. 4. A second option 512 is to record Movie1 and Sitcom4 at their currently schedule times (e.g., as shown in FIG. 3), and to delay recording Drama2 to the soonest re-broadcast date and time of Drama2 for which there is not a recording conflict, which corresponds to row 411 of FIG. 4. A third option 513 is to record Drama2 and Sitcom4 at their currently schedule times (e.g., as shown in FIG. 3), and to delay recording Movie1 to the soonest re-broadcast date and time of Movie1 for which there is not a recording conflict, which corresponds to row 416 of FIG. 4.

In embodiments, each of the options 511, 512, 513 indicates a duration of the delay, as well as the date and recording time of the re-broadcast that will be recorded. In this manner, implementations of the invention automatically determine and present the user with solutions for recording all of the programs involved in a recording conflict. In aspects, the determining and presenting are automatically performed by the system in that once the user requests the recording that triggers the conflict, the user need not take any action for the determining and presenting of options to occur.

In embodiments, the interface 500 also includes options for canceling respective ones of the programs involved in the recording conflict. For example, a fourth option 514 included in interface 500 is to cancel the request to record Sitcom4, which results in maintaining the scheduled recordings of Drama2 and Movie1, e.g., at the times shown in FIG. 3. A fifth option 515 included in interface 500 is to cancel the scheduled recording of Drama2, which results in maintaining the scheduled recordings of Sitcom4 and Movie1, e.g., at the times shown in FIG. 3. A sixth option 516 included in interface 500 is to cancel the scheduled recording of Movie1, which results in maintaining the scheduled recordings of Drama2 and Sitcom4, e.g., at the times shown in FIG. 3.

In embodiments, the user may navigate within the interface 500 using the I/O device 28, such as a remote control or separate computing device that communicates with the DVR 205. For example, the user may employ buttons on a remote control to highlight and select one of the options 511-516. Upon the user selecting one of the options 511-516, the recording module 50 appropriately changes the recording schedule saved in the memory of the DVR 205 to reflect the solution associated with the option.

In the event that the system cannot find any future re-broadcasts for one of the programs involved in the recording conflict, then the system does not display a delaying option for that program in interface 500. For example, in the event that the recording module cannot find any future re-broadcasts of Movie1, then interface 500 would be displayed with options 511, 512, 514, 515, and 516, but without option 513. In this manner, the user is automatically provided with at least one option for delaying recording of at least one of the programs involved in the recording conflict.

The interface 500 of FIG. 5 shows options based on resolving the recording conflict by determining varying amounts of delay that occur based on recording the conflicted shows in their entirety at respective time slots. Additional aspects of the invention resolve recording conflicts by recording different portions of one or more of the programs at different time slots. For example, referring to the recording conflict described at FIGS. 3 and 4, the recording module (e.g., recording module 50) may determine a solution that involves: recording the first 1.5 hours of Movie1 from 8:00 PM-9:30 PM; recording all of Drama2 from 9:00 PM-10:00 PM; recording all of Sitcom4 from 9:30 PM-10:00 PM; and recording the last 30 minutes of Movie1 at the next available time, e.g., from 9:30 AM-10:00 AM the next day as indicated by row 416 of FIG. 4. In this manner, the recording of one of the programs is split into separate partial recordings at different time slots. In embodiments, the recording module may be configured to combine the two separate recordings of the split program, e.g., of Movie1 in this example, into a single recording of the entire program, e.g., by stitching the program, and save the combined recording of the entire program as a single entry in the DVR.

Figure 6:
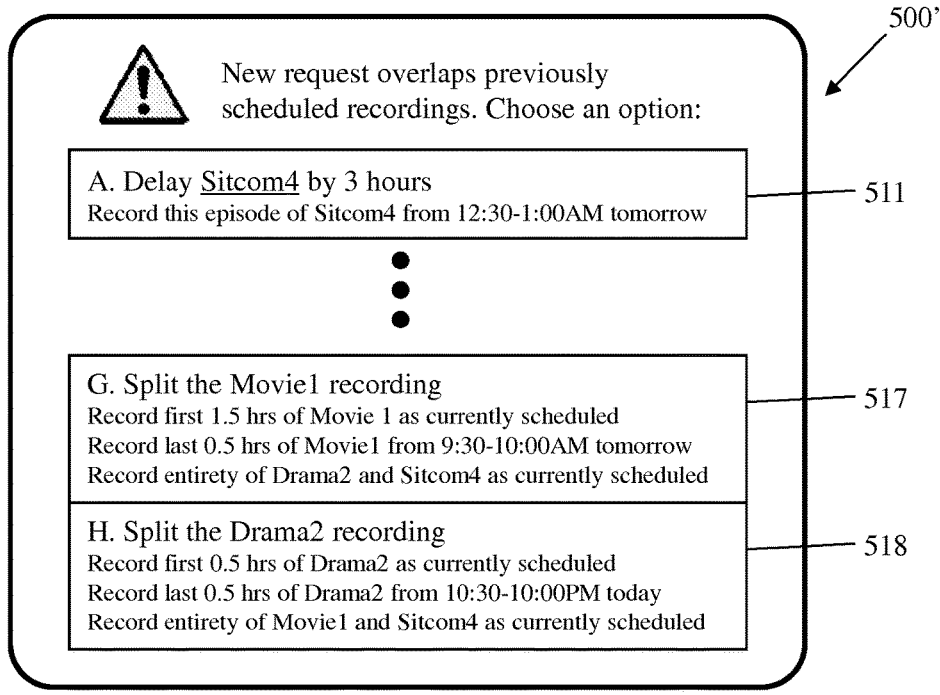

FIG. 6 shows interface 500' including additional options 517 and 518 in which one of the programs is split and recorded at separate time slots. As with the options 511-513, options 517 and 518 are automatically determined by the recording module and presented to the user for selection. When the user selects one of the options 517 and 518, the recording module saves the appropriate recording scheduling data in the memory of the DVR. Permission for the recording module to split recordings, e.g., as described in FIG. 6, may be configured as an option that the user may selectively toggle on and off via menu settings of the DVR.

Implementations of the inventions are not limited to splitting only one of the programs into two separate partial recordings. Instead, the recording module may be programmed to determine solutions that involve splitting more than one of the programs involved in the recording conflict. Additionally or alternatively, the recording module may be programmed to determine solutions that involve splitting a program into three or more separate partial recordings at different time slots. For example, a recording module may determine a solution that includes: recording the first 30 minutes of three different programs (ProgramA, ProgramB, ProgramC) at three different time slots as originally requested by a user; recording the last 120 minutes of ProgramA an hour later than the time slot originally requested by the user; recording the last 90 minutes of ProgramB six hours later than the time slot originally requested by the user; and recording the last 30 minutes of ProgramC a day later than the time slot originally requested by the user. Such solutions may be determined based on determined re-broadcast times, as with the previously described solutions.

Figure 7:
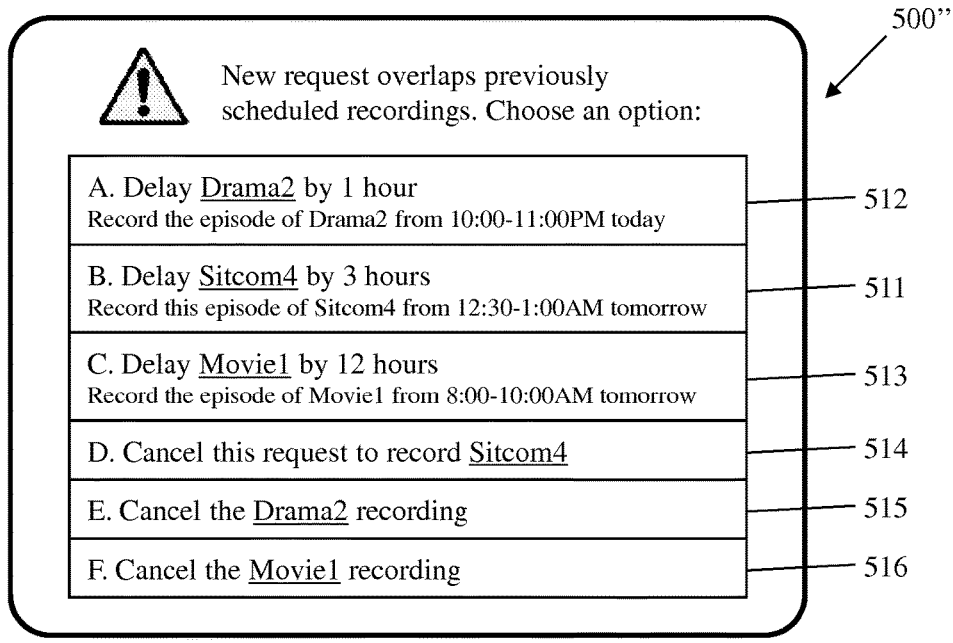

In embodiments, the recording module may be configured to rank and display the options (e.g., options 511-518) based on shortest amount of delay. For example, as shown in FIG. 7, the interface 500" lists option 512 at the top of the list because it has the shortest delay (e.g., 1 hour), then option 511 (3 hour delay), then option 513 (12 hour delay). Alternatively to ranking all options by shortest delay, the recording module may be configured to automatically select the option with the shortest delay, thereby reducing the number of steps involving the user. Displaying a list ranked according to shortest delay, and automatically selecting the shortest delay may be configured as options that the user may selectively toggle on and off in the settings of the DVR.

In further embodiments, the recording module may be configured to incorporate user-defined priorities in generating recording conflict solutions. For example, a user may define a particular program as a high priority, e.g., by defining settings for the program using a DVR-based menu when scheduling the recording of the program in the program guide. When a high priority program is one of the programs involved in a recording conflict, the recording module may be configured to rank and display the options (e.g., options 511-518) based on shortest amount of delay for the high priority program. When plural high priority programs are involved in a recording conflict, the recording module may be configured to rank and display the options (e.g., options 511-518) based on shortest amount of delay to complete the recordings of the plural high priority programs.

Additionally or alternatively, plural different users may each have a respective priority. For example, userA may have a high priority and userB may have a low priority saved by the recording module. The particular user scheduling a recording may be identified to the DVR by login, menu selection, stored credentials, or the like. When one or more userA programs and one or more userB programs are involved in a recording conflict, the recording module may be configured to rank and display the options (e.g., options 511-518) based on shortest amount of delay to record the programs of the higher priority user (e.g., userA in this example). Alternatively to ranking options based on priorities (e.g., show priority and/or user priority), the recording module may be configured to automatically select and implement the option that minimizes the delay and satisfies the priorities.

In further aspects, the recording module may be configured to incorporate user calendar data in generating solutions to a recording conflict. For example, a user may have an electronic calendar stored on a separate compute device, and the recording module may have access to the user calendar via the network interface 56 of FIG. 1. In embodiments, the recording module may be configured to resolve a recording conflict by moving one or more of the recordings to times indicated with a particular status in the calendar, such as busy, out-of-town, etc.

In additional aspects, the recording module may be configured to generate a solution that re-schedules plural scheduled recordings, including recordings of programs that are not involved in the initial recording conflict. For example, an initial recording conflict may involve three programs. The recording module may determine a re-broadcast time for one of the three programs that solves the initial recording conflict. However, re-scheduling at the determined re-broadcast time may create a secondary (new) conflict with two other already scheduled recordings. In such an event, the recording module may be configured to determine future re-broadcast times for all five programs, and determine and display options for recording all five programs (e.g., in a manner similar to FIGS. 4 and 5).

Flow Diagram

Figure 8:
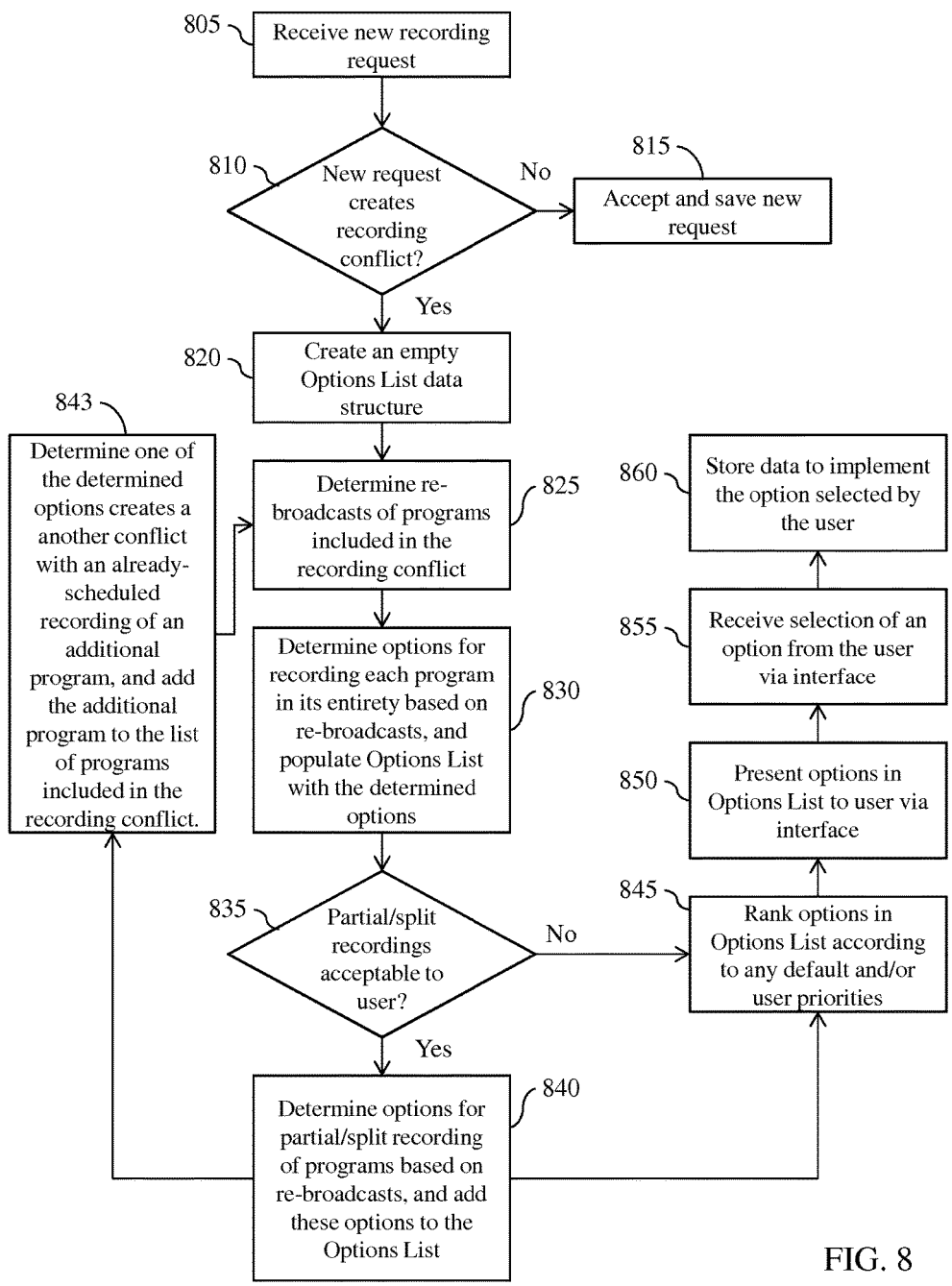
FIG. 8 shows an exemplary flow diagram of a process in accordance with aspects of the invention.

FIG. 8 shows an exemplary flow for performing aspects of the present invention. The steps of FIG. 8 may be implemented in the environment of FIG. 1, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 8 depicts an exemplary flow for a process in accordance with aspects of the present invention. At step 805, a system receives a request to record media. In embodiments, the system comprises computing device 14 of FIG. 1 and the request is a request to record a program at a channel, date, and time. In particular embodiments, the computing device 14 comprises a DVR (e.g., DVR 205) and the request is received via an I/O device (e.g., I/O device 28) such as a remote control or other computer device that communicates with the DVR.

At step 810, the system determines whether the new request (from step 805) creates a recording conflict. In embodiments, a recording module (e.g., recording module 50) included in the system compares the date and time of the new request to stored dates and times of already scheduled recordings. A conflict may be determined by determining whether a number of recordings at any single time slot exceeds a maximum number of simultaneous recordings supported by the DVR. Steps 805 and 810 may be carried out in a manner similar to that described with respect to FIGS. 2 and 3.

In the event the new request does not create a recording conflict, then at step 815 the system accepts and saves the new request. On the other hand, in the event the new request does create a recording conflict, then at step 820 the system creates a new "Options List" data structure. At step 825 the system determines dates and times of future broadcasts (e.g., re-broadcasts) of each of the programs involved in the recording conflict, which may be performed in manner similar to that described with respect to FIG. 4. At step 830, the system determines respective options for delaying the recording of respective ones of the programs based on the determined re-broadcasts. The options at step 830 may be determined in a manner similar to that described with respect to options 511-513 described in FIG. 5. Step 830 may also include the system populating the "Options List" data structure with the determined options.

At step 835, the system determines whether the user has indicated that partial (e.g., split) recordings are acceptable. For example, the user may selectively indicate, e.g., via a settings interface or menu, that partial recordings are either acceptable or unacceptable. If the user has indicated that partial recordings are acceptable, then at step 840 the system determines options that resolve the recording conflict based on: scheduled recording dates and times, the previously determined re-broadcast dates and times, and splitting the recording of at least one of the programs included in the recording conflict. The options at step 840 may be determined in a manner similar to that described with respect to options 517 and 518 described in FIG. 6. Step 840 may also include the system populating the "Options List" data structure with the determined options.

At step 843, the system may optionally determine whether any of the options (e.g., solutions) determined at step 830 or step 840 creates a new recording conflict, e.g., with another program that is scheduled for recording but is not currently included in the list of programs involved in the recording conflict. In the event that one of the determined options creates a new recording conflict, then the additional program(s) included in the new recording conflict are added to the list of programs in the current conflict. The process then returns to step 825 to determine re-broadcast times for all programs now included in the recording conflict.

At step 845, the system ranks the options included in the "Options List" data structure, e.g., from step 830 or steps 830 and 840, according to any default and/or user-defined priorities. For example, a default priority may be used to rank the options in order of shortest delay, e.g., as shown in FIG. 7. Other examples of priorities include, but are not limited to: priorities associated with one or more of the programs included in the conflict, and priorities associated with users who requested the recording of the programs included in the conflict.

At step 850, the system presents the options contained in the "Options List" data structure to the user via an interface. In embodiments, the interface is an interactive interface in which the user may navigate and select one of the listed options. For example, the interface may be a graphic interface (e.g., interface 500, 500', 500", etc.) that is displayed on the user display device (e.g., television or the like), and within which the user may navigate with a remote control. As depicted in FIGS. 5 and 7, the interface may include options to cancel one of the recordings (e.g., options 514-516).

At step 855, the system receives a selection of one of the options from the user. For example, the user may use a remote control or the like to select one of the options presented in the interface. At step 860, the system stores data that implements the option (e.g., the recording solution) selected by the user at step 855.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
presenting, by a computing device, a user with selectable options to:
rank a plurality of options that resolve a recording conflict according to shortest delay from a first time slot to a later time slot;
rank the plurality of options that resolve the recording conflict according to user-defined program priorities;
rank the plurality of options that resolve the recording conflict according to user-defined user priorities;
determine the plurality of options that resolve the recording conflict based on a user calendar; and
determine the plurality of options that resolve the recording conflict based on a user-indicated tolerance for partial recordings;
receiving, by the computing device, a user selected configuration assigning a higher priority to a first user and a lower priority to a second user;
identifying, by the computing device, a plurality of programs as being associated with the first user or the second user;
receiving, by the computer device, a user indication that one or more of the plurality of programs are high priority programs;
receiving, by the computer device, a user selection to rank a plurality of options that resolve a recording conflict based on a shortest amount of delay for the one or more high priority programs;
receiving, by the computer device, a recording request from a user to record a program from a sole media source;
determining, by the computer device, the recording conflict based on the recording request, wherein the recording conflict includes the plurality of programs;
searching, by the computer device, only scheduling data from the sole media source for the plurality of options to resolve the recording conflict using one or more selected from the group consisting of: a program name, an episode number, a unique identifier, and original broadcast data;
generating, by the computer device, the plurality of options that resolve the recording conflict, wherein the plurality of options are based on: determining available re-broadcasts of the plurality of programs from only the sole media source, and a user calendar containing user status data, and the plurality of options include respective options for delaying recording each one of the plurality of programs;
ranking, by the computer device, the plurality of options based on the shortest amount of delay to record one or more of the plurality of programs associated with the higher priority first user to generate a list of the plurality of ranked options;
presenting, by the computer device, the plurality of ranked options to the user through an interface, wherein the presenting includes displaying an amount of delay associated with each one of the respective plurality of ranked options for delaying recording each one of the plurality of programs;
receiving, by the computer device, a selection of one of the plurality of ranked options by the user via the interface; and
storing, by the computer device, the data defining a recording schedule that includes a recording of each of the plurality of programs based on the received selection.

2. The method of claim 1, further comprising:
receiving, by the computer device, a user selected time period that limits an extent of a search for the re-broadcasts, wherein the generating the plurality of options that resolve the recording conflict is based on determining available re-broadcasts of the plurality of programs within the selected time period.

3. A computer program product for resolving recording conflicts, the computer program product comprising a computer usable hardware storage device having program code embodied in the storage device, the program code readable/executable by a computing device to:
present a user with selectable options to:
rank a plurality of options that resolve a recording conflict according to shortest delay from a first time slot to a later time slot;
rank the plurality of options that resolve the recording conflict according to user-defined program priorities;
rank the plurality of options that resolve the recording conflict according to user-defined user priorities;
determine the plurality of options that resolve the recording conflict based on a user calendar; and
determine the plurality of options that resolve the recording conflict based on a user-indicated tolerance for partial recordings;
receive a user selection of the option to rank a plurality of options that resolve a recording conflict according to shortest delay from a first time slot to a later time slot for the one or more high priority programs;
receive a user selected configuration assigning a higher priority to a first user and a lower priority to a second user;
identify a plurality of programs as being associated with the first user or the second user;
receive a user indication that one or more of the plurality of programs are high priority programs;
receive a recording request from the user to record a program from a sole media source;
determine the recording conflict based on the recording request, wherein the recording conflict includes the plurality of programs;
search only scheduling data from the sole media source for the plurality of options to resolve the recording conflict using one or more selected from the group consisting of: a program name, an episode number, a unique identifier, and original broadcast data;
generate, based on the search, the plurality of options that resolve the recording conflict based on the user selection of the selectable options; and
present the plurality of options to the user,
wherein:
the determining, the generating, and the presenting are performed automatically after the receiving the recording request;
the plurality of options includes a first set of respective options for delaying recording each one of the plurality of programs and a second set of respective options for canceling recording each one of the plurality of programs; and the presenting comprises displaying an amount of delay associated with each said one of the respective options for delaying recording each one of the plurality of programs;
rank the plurality of options based on the shortest amount of delay to record one or more of the plurality of programs associated with the higher priority first user to generate a list of the plurality of ranked options;
present the plurality of ranked options to the user through an interface, wherein the presenting includes displaying an amount of delay associated with each one of the respective plurality of ranked options for delaying recording each one of the plurality of programs;
receive a selection of one of the plurality of ranked options by the user via the interface; and
store the data defining a recording schedule that includes a recording of each of the plurality of programs based on the received selection;
further determine at least one of the plurality of options creates an additional recording conflict with at least one additional program;
further generate a new plurality of options that resolve the recording conflict and the additional recording conflict; and
display an amount of delay associated with each said one of the respective new plurality of options for delaying recording each one of the plurality of programs.

4. The computer program product of claim 3, wherein the program code is further readable/executable by the computing device to receive a user selected time period that limits an extent of a search for the re-broadcasts, wherein the generating the plurality of options that resolve the recording conflict is based on determining available re-broadcasts of the plurality of programs within the selected time period.

5. A system, comprising:
a CPU, a computer readable memory and a computer readable storage medium;
program instructions to present a user with selectable options to:
rank a plurality of options that resolve a recording conflict according to shortest delay from a first time slot to a later time slot;
rank the plurality of options that resolve the recording conflict according to user-defined program priorities;
rank the plurality of options that resolve the recording conflict according to user-defined user priorities;
determine the plurality of options that resolve the recording conflict based on a user calendar; and
determine the plurality of options that resolve the recording conflict based on a user-indicated tolerance for partial recordings;
program instructions to receive a user selected configuration assigning a higher priority to a first user and a lower priority to a second user;
program instructions to identify a plurality programs as being associated with the first user or the second user;
program instructions to receive a user indication that one or more of the plurality of programs are high priority programs;
program instructions to automatically determine a recording conflict based on a recording request, wherein the recording conflict includes the plurality of programs;
program instructions to search only scheduling data from the sole media source for a plurality of options to resolve the recording conflict using one or more selected from the group consisting of: a program name, an episode number, a unique identifier, and original broadcast data;
program instructions to automatically generate, based on the search and a user calendar containing user status data, the plurality of options that resolve the recording conflict, wherein the plurality of options are based on re-broadcasts of each of the plurality of scheduled programs from the sole media source;
program instructions to rank the plurality of options based on a shortest amount of delay to record one or more programs associated with the higher priority first user to generate a list of a plurality of ranked options;
program instructions to automatically present the plurality of ranked options to a user as selectable options in an interface;
program instructions to automatically simultaneously present, in a single interface, an amount of delay associated with each of the plurality of ranked options, and the time and day of each of the plurality of ranked options;
program instructions to receive a selection of one of the plurality of ranked options by the user via the interface; and
program instructions to store data defining a recording schedule that includes a recording of each of the plurality of programs based on the received selection,
wherein the program instructions are stored on the computer readable storage medium for execution by the CPU via the computer readable memory.

6. The system of claim 5, further comprising:
program instructions to retrieve the user status data from the user calendar via a network interface.

7. The system of claim 5, further comprising program instructions to receive a user selected time period that limits an extent of a search for the re-broadcasts, wherein the program instructions to automatically generate the plurality of options that resolve the recording conflict is based on determining available re-broadcasts of the plurality of programs within the selected time period.

* * * * *